United States Patent [19]
Daniels

[11] Patent Number: 5,118,231
[45] Date of Patent: Jun. 2, 1992

[54] TOOL HOLDER
[76] Inventor: Edward J. Daniels, Decatur, Ind.
[21] Appl. No.: 709,507
[22] Filed: May 3, 1991
[51] Int. Cl.[5] .............................................. B23B 31/00
[52] U.S. Cl. .................. 409/232; 428/239 R; 409/234
[58] Field of Search ............... 409/231, 232, 233, 234; 408/231, 233, 239 A, 239 R; 279/7

[56] References Cited
U.S. PATENT DOCUMENTS

| 4,607,989 | 8/1986 | Kitamura | 409/234 |
| 5,009,555 | 4/1991 | Kitamura | 409/234 |

FOREIGN PATENT DOCUMENTS

| 2831660 | 3/1979 | Fed. Rep. of Germany | 409/234 |
| 21706 | 2/1981 | Japan | 409/232 |
| 102547 | 6/1984 | Japan | 409/232 |
| 1136747 | 6/1986 | Japan | 409/231 |
| 79932 | 4/1987 | Japan | 409/232 |
| 2137123 | 10/1984 | United Kingdom | 409/231 |

OTHER PUBLICATIONS

Maho Machine Tool corp.; Innovations: Jan. 1991; p. 14.
Aluminum, Fabrication and Finishing, vol. 3; 1967; American Society for Metals; 654-6: hard anodic coating process.

Primary Examiner—Daniel W. Howell
Attorney, Agent, or Firm—Lundy and Associates

[57] ABSTRACT

An improved tool holder having a body with means for connecting the tool holder to a numerical controlled machine or universal milling and boring machine and for driving the tool holder and means by which machine tools can be connected to the tool holder. The tool holder body is of malleable and ductile aluminum with an exterior coating of no less than 60 rockwell hardness.

16 Claims, 3 Drawing Sheets

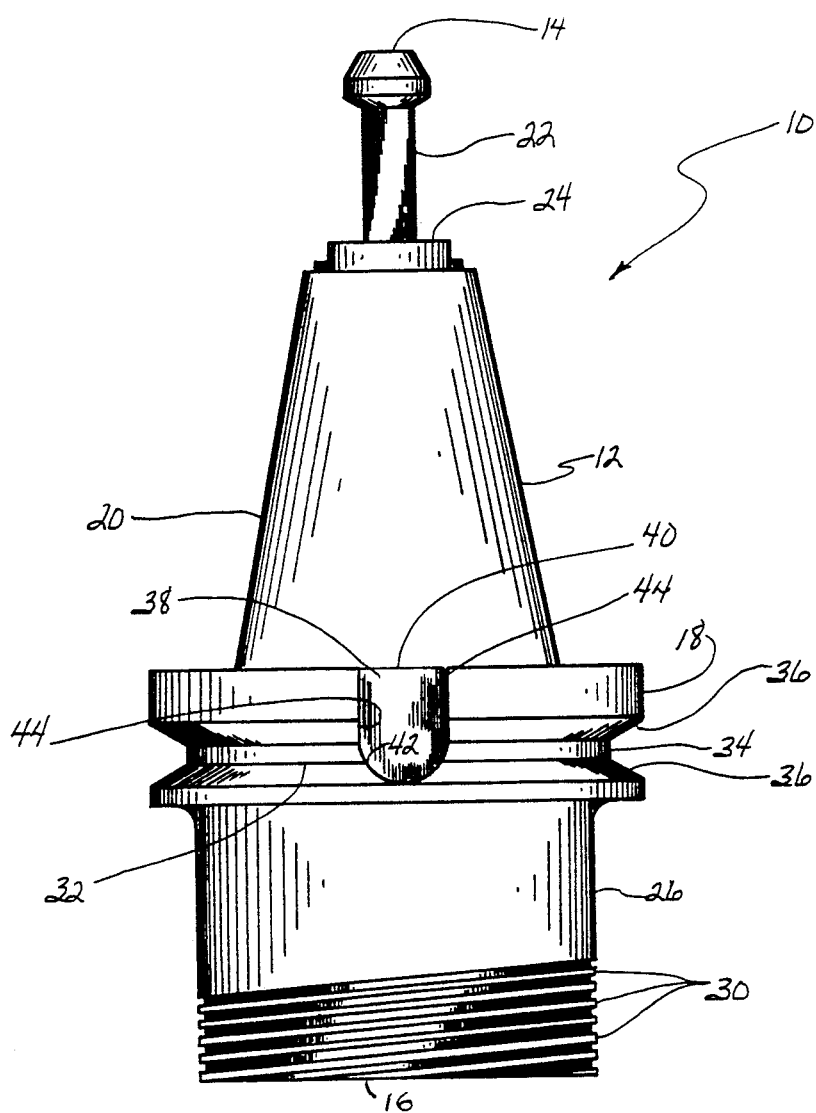
FIG. 1
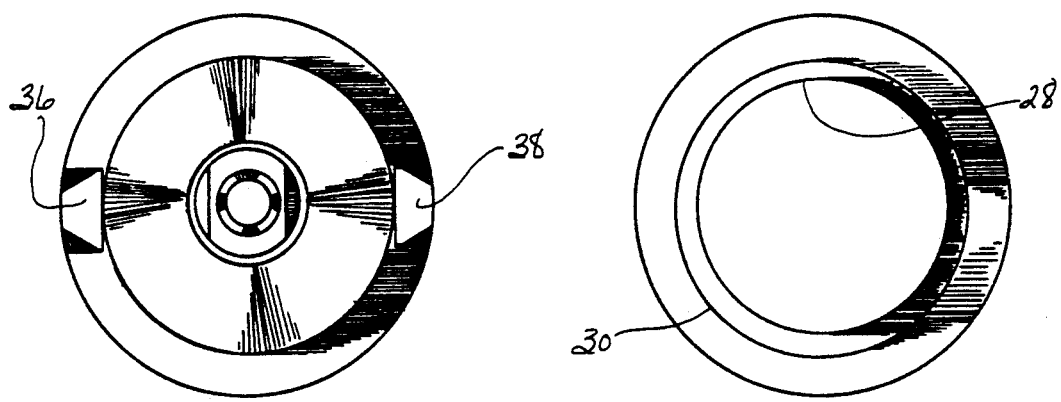
FIG. 2
FIG. 3

TOOL HOLDER

BACKGROUND OF THE INVENTION

The subject matter of the invention relates to numerical control machines and universal milling and boring machines, and more particularly to tool holders for such machines.

A plurality of universal milling and boring machines and numerical controlled machines have been available in the marketplace. Universal milling and boring machines each have the capability of holding a plurality of tools, each of which perform one or more machining operations on a work piece in accordance with a pre-programmed schedule. Such machines are capable of holding from a few to hundreds of tools on an automatic tool changer having a spindle or a magazine on which tool holders are positioned each with a tool having a particular machining function.

Universal tool holders have been provided for such spindles and magazines. However, all automatic tool changers have maximum weight specifications which almost always is less than the weight of the capacity of tools and tool holders. For example, a specific tool changer for a FNC60-A20 vertical machining center as manufactured by MAHO allows for 20 tools to be positioned in the tool changer, but requires both the tool changers and the tools to weigh no more than seven kilograms or about 15½ pounds. Utilizing automatic tool changers with the maximum number of tools almost always exceeds these specifications and thereby overloads the automatic tool changer, its bearings and wearable parts.

Therefore, it has been commonplace that automatic tool changers experience high wear and tear. Both spindle bearings and belts have relatively short lives. Spindles or magazines have less than desirable lives and excessive down time is experienced. Occasionally, an automatic tool changer breaks causing both down time and injury to operating personnel. Furthermore, it is not uncommon that machine tools having single tools have tool holders which weigh in excess of 100 pounds.

Even with those automatic tool changers having a great number of tools, the tools and tool holders are not lightweight, such that changing tools can readily fatigue a machinist. Since a growing number of machinists are female, changing tools readily fatigue operators whereby production suffers and safety becomes a concern.

Therefore, it is highly desirable to provide an improved tool holder for numerical controlled machines and universal milling and boring machines.

It is also highly desirable to provide an improved tool holder for the spindles or magazines of such machines which is significantly lighter in weight than conventional tool holders.

It is also highly desirable to provide an improved tool holder for numerical controlled machines and universal milling and boring machines which allows the automatic tool changer to be fitted with the maximum number of tools without causing excessive wear on bearings, belts, spindles or magazines.

It is also highly desirable to provide an improved tool holder for numerical controlled machines and universal milling and boring machines which allow the automatic tool changer to be fitted with the maximum number of tools without causing spindles or magazines to break during use.

It is also highly desirable to provide an improved tool holder for numerical controlled machines and universal milling and boring machines which allow the automatic tool changer to be fitted with the maximum number of tools without resulting in injury to the operator.

It is also highly desirable to provide an improved tool holder for numerical controlled machines and universal milling and boring machines which allow the automatic tool changer to be fitted with the maximum number of tools without resulting in excessive down time.

It is also highly desirable to provide an improved tool holder for numerical controlled machines and universal milling and boring machines which allow the automatic tool changer to be fitted with the maximum number of tools without causing operator fatigue.

It is also highly desirable to provide an improved tool holder for numerical controlled machines and universal milling and boring machines which allow the automatic tool changer to be fitted with the maximum number of tools without causing a safety hazard.

It is finally highly desirable to provide an improved tool holder for numerical controlled machines and universal milling and boring machines having all of the above features.

SUMMARY OF THE INVENTION

It is an object of the invention to provide an improved tool holder for numerical controlled machines and universal milling and boring machines.

It is also an object of the invention to provide an improved tool holder for the spindles or magazines of such machines which is significantly lighter in weight than conventional tool holders.

It is also an object of the invention to provide an improved tool holder for numerical controlled machines and universal milling and boring machines which allows the automatic tool changer to be fitted with the maximum number of tools without causing excessive wear on bearings, belts, spindles or magazines.

It is also an object of the invention to provide an improved tool holder for numerical controlled machines and universal milling and boring machines which allow the automatic tool changer to be fitted with the maximum number of tools without causing spindles or magazines to break during use.

It is also an object of the invention to provide an improved tool holder for numerical controlled machines and universal milling and boring machines which allow the automatic tool changer to be fitted with the maximum number of tools without resulting in injury to the operator.

It is also an object of the invention to provide an improved tool holder for numerical controlled machines and universal milling and boring machines which allow the automatic tool changer to be fitted with the maximum number of tools without resulting in excessive down time.

It is also an object of the invention to provide an improved tool holder for numerical controlled machines and universal milling and boring machines which allow the automatic tool changer to be fitted with the maximum number of tools without causing operator fatigue.

It is also an object of the invention to provide an improved tool holder for numerical controlled machines and universal milling and boring machines which allow the automatic tool changer to be fitted with the maximum number of tools without causing a safety hazard.

It is finally an object of the invention to provide an improved tool holder for numerical controlled machines and universal milling and boring machines having all of the above features.

In the broader aspects, the invention provides an improved tool holder having a body with means for connecting the tool holder to a numerical controlled machine or universal milling and boring machine and for driving the tool holder and means by which machine tools can be connected to the tool holder. The tool holder body is of ductile and malleable aluminum with an exterior coating of no less than about 60 rockwell hardness.

BRIEF DESCRIPTION OF THE DRAWINGS

The above-mentioned and other features and objects of the invention and the manner of attaining them will become more apparent and the invention itself will be better understood by reference to the following description of an embodiment of the invention taken in conjunction with the accompanying drawings wherein:

FIG. 1 is a side view of an improved tool holder of the invention.

FIG. 2 is a top view of the tool holder shown in FIG. 1.

FIG. 3 is a bottom view of the tool holder shown in FIG. 1.

DESCRIPTION OF A SPECIFIC EMBODIMENT

Figures 4, 5:
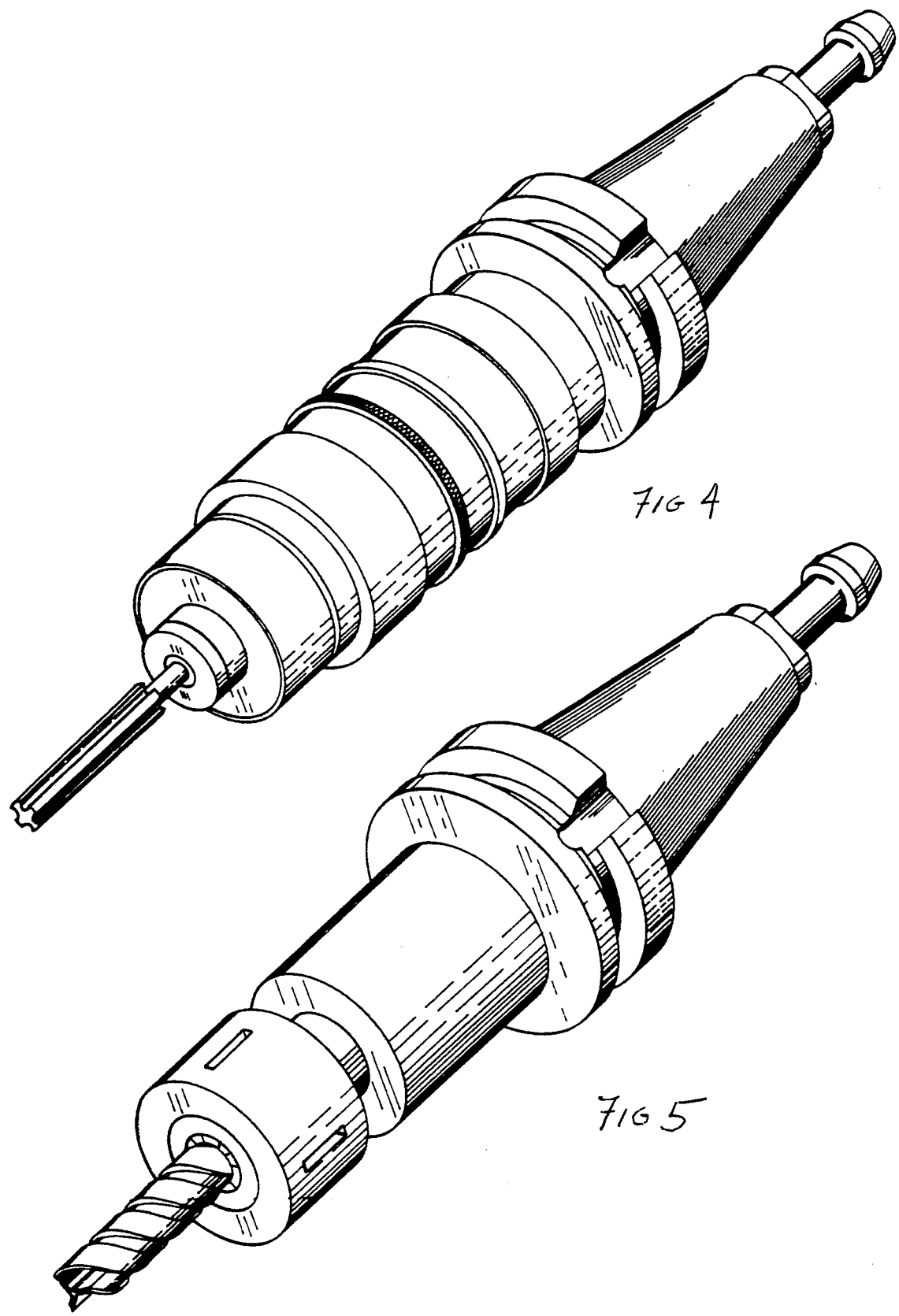
FIG. 4 is a prospective view of the tool holder shown in FIG. 1 having a reamer secured thereto.
FIG. 5 is a prospective view of the tool holder shown in FIG. 1 having a borer secured thereto.
Figure 6:
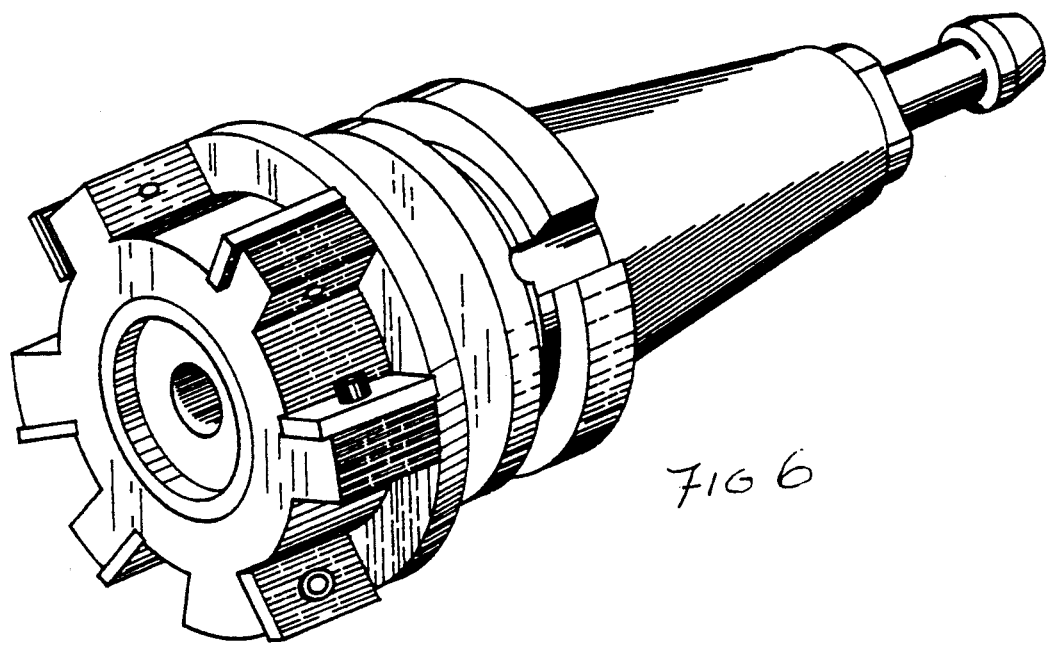
FIG. 6 is a prospective view of the tool holder shown in FIG. 1 having a miller secured thereto.
Figure 7:
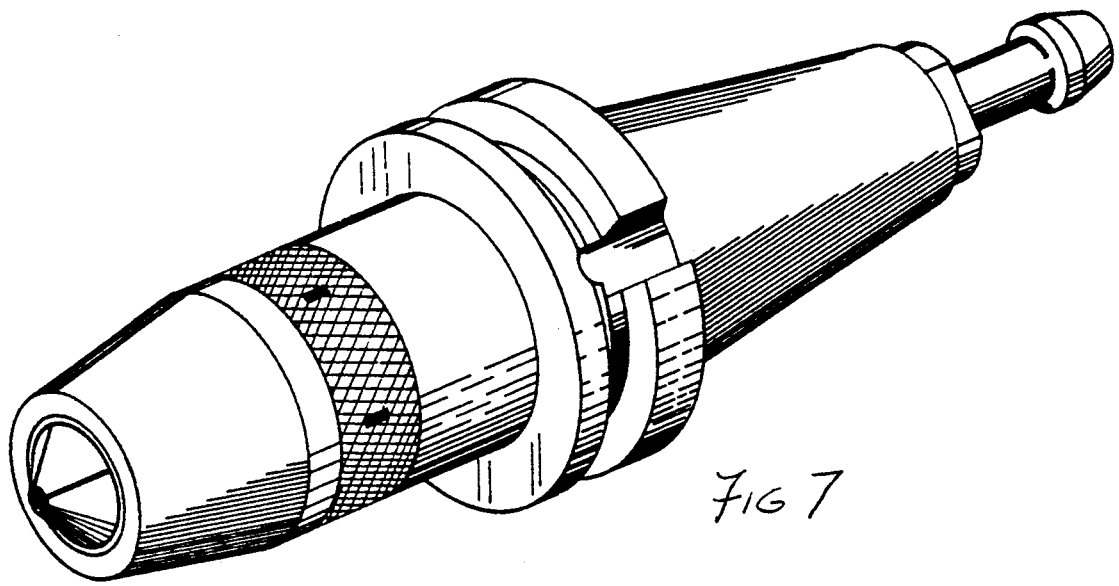
FIG. 7 is a prospective view of the tool holder shown in FIG. 1 having a drill chuck secured thereto.

The improved tool holder 10 of the invention is specifically designed for use on numerical controlled machines and universal milling and boring machines. These machines have either a spindle which holds a plurality of tool holders 10 or a magazine which holds a plurality of tool holders 10. Both the spindles and magazines of these machines are automatically indexed to position one of the tools of the tool holder in operable position in response to a preprogrammed machining sequence. Each of the spindles and magazines have a plurality of cavities in which the tool holders 10 are inserted and held. These cavities may number from a few to over one hundred.

A tool holder which is useful with such automatic tool changers incorporating spindles or magazines is shown in FIG. 1 to comprise a body 12 having opposite ends 14, 16 separated by a collar 18. Adjacent end 14 is an attachment portion 20 which extends between end 14 and collar 18. Attachment portion 20 is essentially conical in shape. At the apex of the conical portion 20 is a pin 22. Between the pin 22 and the conical portion 20 is a nut 24 to which a wrench can be connected for attaching the tool holder to the machine tool as desired.

Adjacent end 16 extending between end 16 and collar 18 is a shank 26. Shank 26 has a cylindrical bore 28 therein. Adjacent end 16 are positioned a plurality of exterior threads 30. Threads 30 serve the purpose of attaching a machine tool or a chuck which in turn holds a machine tool or the like.

Collar 18 is provided with a collar groove 32 having a groove bottom 34 and opposite upstanding sides 36. Sides 36 slope outwardly from the bottom 34 as shown in FIG. 1. Key slots 38 are provided at diametrically opposite positions on the collar 18. Key slots 38 extend into the collar 18, have an open top 40 and a rounded bottom 42 with upstanding sides 44. Key slots 38 are complementary in shape to keys (not shown) on the machine tools, spindle or magazine.

The entire body 12 is formed of malleable and ductile aluminum. In a specific embodiment, the aluminum is 6061T6 aluminum. However, other 6000, 7000, 5000, 3000 and 2000 alloys can be used. The various shapes of the body 12, collar 18, shank 26, pin 14 and nut 24 are machined, or otherwise formed from aluminum to have exterior dimensions of about 0.001 to about 0.005 (usually about 0.001 to about 0.003) less than the dimensions desired. Body 12 is then provided with a surface coating of aluminum which expands and extends into body 12 about 0.001 to about 0.005 inches in a specific embodiment. The specific thickness of the exterior coating of the body 12 is not essential to the invention so long as the surface coating has a rockwell hardness of about 60 to about 70 rockwell and the surface coating does not affect the physical properties of the malleable and ductile aluminum of the body 12.

Significantly, at those portions of body 12 which have relatively small thicknesses, such as the threads 30, it is essential that the surface coating does not render those portions of body 12 brittle or otherwise of incapable of withstanding the force, stress and impact which might cause failure of the tool holder. In specific embodiments, threads 30 must be dimensioned with the thickness of the surface coat in mind so as to accomplish this goal.

In a specific embodiment, the surface coating is applied to the body 12 after the body 12 is formed as above described in accordance with conventional aluminum hardcoat or hard amodic anodizing techniques. Typically, these coatings are applied by electrolysis with the body 12 as the amode in a sulfuric acid based electrolyte containing from about 12 to about 15 percent weight sulfuric acid at electrolyte temperatures of about 25° to about 50° F., current densities of about 24 to about 36 amps per square foot, and voltages above 70 volts for 110 minutes or less. The current densities can be increased in some applications by superimposing alternating current on direct current.

In operation, the tool holders of the invention experience wear, force, impact, stress, fatigue applied either during use, set up, continuously or repeatedly, as the case may be. While aluminum is well known to be significantly lighter than steel, aluminum is also well known to be a relatively soft metal and a metal incapable of withstanding the wear, force, stress, fatigue and impact which these tool holders experience during use. Surprisingly, the tool holder of the invention withstands those forces at the critical points of tool attachment, the attachment of the tool holder to the machine, and the exposed portions of the tool holder as well as tool holders of machined steel.

The tool holders constructed in accordance with the above description have been in use for a six month period of time during which they were periodically inspected for wear, breakage and the like. Tool holders made in accordance with the invention appear to withstand use as well as similar tool holders made of steel.

In use, machine tools are attached to the tool holders of the invention. The tool holder 10 as shown in FIGS. 1 through 3 are attached to the desired machine tool by the threads 30 on the shank 26 adjacent end 16. Drill chucks are threadedly secured to the shank 16 and drills of various sizes can be positioned within the chucks. Reamers and borers larger in diameter than shank 26 are threaded directly on to the shank 26. Reamers and borers having a diameter less than the diameter of shank 26 are usually mounted on a base having a diameter greater than shank 26 such that the reamers and borers can be threadedly secured directly on shank 26 by means of the threads 30.

Assembly may be made by placing the tool holders 10 of the invention in a spindle or a magazine pocket of a conventional numerically controlled machine or a universal milling and boring machine as with the tool holders 10 of the invention or merely bolting the same onto the tool receiver of a conventional cutter or milling machine. Both procedures are well known to those skilled in the art to which this invention pertains.

The new, novel and improved tool holder of the invention provides an improved tool holder for numerical controlled machines and universal milling and boring machines having spindles or magazines and cutting and milling machines which are significantly lighter in weight than conventional tool holders, allows automatic tool changers to be fitted with the maximum number of tools allowable without exceeding tool weights specified, and without putting undue stress on bearings, belts, spindles or magazines, minimizes the wear often experienced on the spindle and magazines and other expensive parts, minimizes the likelihood of spindle and magazine breakage, down time, and injury, and minimizes operator fatigue.

While a specific embodiment of the invention has been shown and described herein for purposes of illustration, the protection afforded by any patent which may issue upon this application is not strictly limited to the disclosed embodiment; but rather extends to all structures and arrangements which fall fairly within the scope of the claims which are appended hereto:

What is claimed is:

1. A tool holder for numerical controlled and universal milling and boring machines comprising a tool holder having a body, said body having a spindle/magazine attachment portion and a machine tool attachment portion, said tool holder body being of aluminum having an exterior coating of about 0.001 to about 0.005 inches of anodized aluminum oxide having a hardness above 60 rockwell.

2. The tool holder of claim 1 wherein said body has opposite ends, said spindle/magazine attachment portion is at one end, said spindle/magazine attachment portion is shaped in size to fit into a spindle of a numerical controlled machine.

3. The tool holder of claim 2 wherein said spindle/magazine attachment portion is conical.

4. The tool holder of claim 2 wherein said spindle/magazine attachment portion and said machine tool attachment portion are separated by a collar.

5. The tool holder of claim 4 wherein said collar has a groove therein, said collar groove having key slots therein.

6. The tool holder of claim 5 wherein said collar groove has a bottom and upstanding sides, said groove sides tapering outwardly from said bottom, said collar key slots being complementary to a spindle key of a numerical controlled machine.

7. The tool holder of claim 5 wherein said collar groove has a bottom and upstanding sides, said groove sides tapering outwardly from said bottom, said collar key slots being complementary to the pocket key of a magazine of an automatic tool changer.

8. The tool holder of claim 1 wherein said body has opposite ends, said spindle/magazine attachment portion is at one end, said spindle/magazine attachment portion is shaped in size to fit into a magazine pocket of an automatic tool changer.

9. The tool holder of claim 8 wherein said machine tool attachment portion is at the other end and has a bore extending from said other end toward said one end and exterior threads.

10. The tool holder of claim 1 wherein said tool attachment portion is a cylindrical shank having a distal end and cylindrical bore therein, said cylindrical bore and shank being coaxial, said bore extending from the distal end of said shank, said shank having a plurality of exterior threads thereon adjacent said distal end.

11. The tool holder of claim 10 wherein a drill chuck is threadedly secured to said shank at said distal end by said threads.

12. The tool holder of claim 10 wherein a borer is secured to said shank at said distal end by said threads.

13. The tool holder of claim 10 wherein a reamer is secured to said shank at said distal end by said threads.

14. The tool holder of claim 10 wherein a miller is secured to said shank at said distal end by said threads.

15. An aluminum tool holder comprising a tool holder body, means for connecting said tool holder body to the automatic tool changer of a machine, and means for removably securing a machine tool to said tool holder body, said tool holder body having an interior body portion of ductile aluminum capable of being machined to a desirable shape and dimensions, said interior body portion dimensions being from about 0.001 to about 0.005 inches less than the desired dimensions for said tool holder, an exterior coating on said interior body portion, said exterior coating being about 0.001 to about 0.005 inches thick, said coating having a hardness of above 60 rockwell.

16. The tool holder of claim 15 wherein said aluminum is chosen from the group consisting of 2000, 3000, 5000, 6000 and 7000 aluminum alloys.

* * * * *

UNITED STATES PATENT AND TRADEMARK OFFICE
CERTIFICATE OF CORRECTION

PATENT NO. : 5,118,231

DATED : June 2, 1992

INVENTOR(S) : Edward J. Daniels

It is certified that error appears in the above-identified patent and that said Letters Patent is hereby corrected as shown below:

On title page, item [22]
    change the filing date from "May 3, 1991" to
                      --June 3, 1991--.

Signed and Sealed this

Fifth Day of October, 1993

*Attest:*

BRUCE LEHMAN

*Attesting Officer*      *Commissioner of Patents and Trademarks*